US012057099B1

(12) United States Patent
Shields et al.

(10) Patent No.: US 12,057,099 B1
(45) Date of Patent: Aug. 6, 2024

(54) ACTIVE NOISE CANCELLATION SYSTEM

(71) Applicant: Dialog Semiconductor B.V., 's-Hertogenbosch (NL)

(72) Inventors: Paul Shields, Dunblane (GB); Wessel Harm Lubberhuizen, Delden (NL); Ashley Hughes, Edinburgh (GB)

(73) Assignee: Renesas Design Netherlands B.V., 's-Hertogenbosch (NL)

( * ) Notice: Subject to any disclaimer, the term of this patent is extended or adjusted under 35 U.S.C. 154(b) by 0 days.

(21) Appl. No.: 17/695,528

(22) Filed: Mar. 15, 2022

(51) Int. Cl.
*G10K 11/178* (2006.01)

(52) U.S. Cl.
CPC .. *G10K 11/17854* (2018.01); *G10K 11/17879* (2018.01); *G10K 2210/1081* (2013.01); *G10K 2210/3012* (2013.01)

(58) Field of Classification Search
None
See application file for complete search history.

(56) References Cited

U.S. PATENT DOCUMENTS

| | | | |
|---|---|---|---|
| 5,262,972 | A | 11/1993 | Holden et al. |
| 5,301,134 | A | 4/1994 | Maruyama |
| 5,305,307 | A | 4/1994 | Chu |
| 5,757,299 | A | 5/1998 | Noro |
| 5,757,862 | A | 5/1998 | Ishizu |
| 5,784,378 | A | 7/1998 | Murray |
| 5,805,479 | A | 9/1998 | Tang |
| 5,904,731 | A | 5/1999 | Matsui |
| 5,946,650 | A | 8/1999 | Wei |
| 7,058,190 | B1 | 6/2006 | Zakarauskas |
| 7,636,747 | B2 | 12/2009 | Watanabe |
| 7,652,604 | B2 | 1/2010 | Parayandeh et al. |
| 7,756,222 | B2 | 7/2010 | Chen et al. |
| 8,737,636 | B2 | 5/2014 | Park et al. |
| 8,896,738 | B2 | 11/2014 | Sato et al. |
| 9,053,697 | B2 | 6/2015 | Park et al. |
| 9,065,471 | B1 | 6/2015 | Okuda |
| 9,209,828 | B2 | 12/2015 | Schubert et al. |

(Continued)

FOREIGN PATENT DOCUMENTS

| | | |
|---|---|---|
| EP | 2 860 874 | 12/2016 |
| GB | 2541977 | 3/2017 |
| WO | 2017/190976 | 11/2017 |

OTHER PUBLICATIONS

D.A. Johns et al., "Sigma-delta based IIR filters, " [1991] Proceedings of the 34th Midwest Symposium on Circuits and Systems, Monterey, CA, USA, May 1992, pp. 210-213, vol. 1.

(Continued)

*Primary Examiner* — Kenny H Truong
(74) *Attorney, Agent, or Firm* — Saile Ackerman LLC; Stephen B. Ackerman

(57) ABSTRACT

An active noise cancellation (ANC) system is presented. The ANC system includes a transducer; a first microphone; and a first adaptive filter coupled to a calculator. The calculator generates an error signal based on a difference between a filtered input signal and a signal from the first microphone. The filtered input signal is based on a first transfer function estimate of the transducer-to-first microphone transfer function via a first acoustic path. The calculator updates coefficients of the first adaptive filter using the error signal and generates with the first adaptive filter a first noise-cancellation signal.

16 Claims, 10 Drawing Sheets

(56) References Cited

U.S. PATENT DOCUMENTS

| | | | | |
|---|---|---|---|---|
| 9,318,094 | B2 * | 4/2016 | Hendrix | G10K 11/17885 |
| 9,361,872 | B2 | 6/2016 | Park et al. | |
| 9,584,146 | B2 | 2/2017 | Op 't Eynde et al. | |
| 9,644,561 | B2 | 5/2017 | Magner | |
| 9,659,558 | B2 | 5/2017 | Park et al. | |
| 9,857,921 | B2 | 1/2018 | Pant | |
| 10,236,905 | B1 | 3/2019 | Callanan et al. | |
| 10,431,198 | B2 * | 10/2019 | Magrath | G10K 11/17875 |
| 10,784,890 | B1 | 9/2020 | Hughes et al. | |
| 10,848,174 | B1 | 11/2020 | Hughes et al. | |
| 10,861,433 | B1 | 12/2020 | Hughes et al. | |
| 10,972,123 | B1 | 4/2021 | Hughes et al. | |
| 11,107,453 | B2 | 8/2021 | Hughes et al. | |
| 11,329,634 | B1 | 5/2022 | Hughes et al. | |
| 2005/0008071 | A1 | 1/2005 | Bose et al. | |
| 2005/0053227 | A1 | 3/2005 | Fortier | |
| 2007/0188218 | A1 | 8/2007 | Jeda | |
| 2007/0273446 | A1 | 11/2007 | Kim | |
| 2007/0285160 | A1 | 12/2007 | Kim | |
| 2008/0225168 | A1 | 9/2008 | Ouslis | |
| 2008/0250093 | A1 | 10/2008 | Zhu | |
| 2010/0318205 | A1 | 12/2010 | Ohkuri | |
| 2011/0007907 | A1 | 1/2011 | Park et al. | |
| 2012/0148074 | A1 | 6/2012 | Bastiaens | |
| 2013/0301846 | A1 * | 11/2013 | Alderson | G10K 11/17819 381/71.7 |
| 2014/0333462 | A1 | 11/2014 | Breems | |
| 2014/0341388 | A1 * | 11/2014 | Goldstein | G10K 11/17827 381/71.11 |
| 2015/0104032 | A1 * | 4/2015 | Kwatra | G10K 11/175 381/71.11 |
| 2015/0263701 | A1 * | 9/2015 | Saeed | H03H 21/0043 708/322 |
| 2017/0053639 | A1 * | 2/2017 | Lu | G10K 11/17881 |
| 2023/0097106 | A1 * | 3/2023 | Peting | H04R 3/00 381/120 |

OTHER PUBLICATIONS

D. A. Johns et al., "Design and analysis of delta-sigma based IIR filters," IEEE Transactions on Circuits and Systems II: Analog and Digital Signal, Processing, vol. 40, Issue: 4, Apr. 1993, pp. 233-240.
D. A. Johns et al., "IIR filtering on sigma-delta modulated signals," Electronics Letters, Feb. 14, 1991, vol. 27, No. 4, pp. 307-308.
D. A. Johns, "Analog and Digital State-Space Adaptive IIR Filters", PHD Thesis, Mar. 1989, 153 pages.
D. A. Johns et al., "Adaptive Recursive State-Space Filters Using a Gradient-Based Algorithm," IEEE Transactions on Circuits and Systems, vol. 37, Issue: 6, Jun. 1990, pp. 673-684.
P. W. Wong et al., "FIR Filters with Sigma-Delta Modulation Encoding," IEEE Transactions on Acoustics, Speech, and Signal Processing, vol. 38, Issue: 6, Jun. 1990, pp. 979-990.
Horst Gether et al., A perspective on digital ANC solutions in a low latency dominated world, EDN, Jun. 19, 2017, https://www.edn.com/design/ analog/4458544/A-perspective-on-digital-ANC-solutions-in-a-low-latency-dominated-world.
M. A. Aldajani et al., "Stability analysis of an adaptive structure for sigma delta modulation," ICECS 2000. 7th IEEE International Conference on Electronics, Circuits and Systems (Cat. No. 00EX445), Dec. 2000, pp. 129-132, vol. 1.
M. A. Aldajani et al., "Stability and Performance Analysis of an Adaptive Sigma-Delta Modulator," IEEE Transactions on Circuits and Systems II: Analog and Digital Signal Processing, vol. 48, No. 3, Mar. 2001, pp. 233-244.
Robert Bristow-Johnson, DSP Trick: Fixed-Point DC Blocking Filter With Noise-Shaping, dspGuru by lowegian International, Apr. 17, 2011, https://dspguru.com/dsp/tricks/fixed-point-dc-blocking-filter-with-noise-shaping/, accessed on Apr. 18, 2019, 2 pages.
Richard G. Lyons, DSP Tricks: DC Removal, Embedded, Aug. 11, 2008, https://www.embedded.com/design/configurable-systems/4007653/DSP-Tricks- DC-Removal, accessed on Apr. 18, 2019, pp. 1-5.
Richard G. Lyons, Understanding digital signal processing, Second Edition, Prentice Hall PTR, 2004, chapter 13, pp. 84-87.
Ali Grami, Introduction to Digital Communications, Elsevier, 2016, chapter 5, pp. 217-264.
A query on the non-uniform Quantization, Stack Exchange, 2017, https://dsp.stackexchange.com/questions/40137/a-query-on-the-non-uniform-quantization, accessed on Apr. 18, 2019.
Jon Dattorro, The Implementation of Recursive Digital Filters for High-Fidelity Audio, Journal of Audio Engineering Society, Nov. 1988, vol. 36, No. 11, pp. 851-878 and Letters to the Editor.
Thomas Kite, Understanding PDM Digital Audio, Audio Precision Inc., 2012, http://users.ece.utexas.edu/~bevans/courses/rtdsp/lectures/10 Data Conversion/AP Understanding PDM Digital Audio.pdr, accessed on Apr. 18, 2019, pp. 1-9.
Xilinx, CIC, Aug. 2007, https://www.mit.bme.hu/systems/files/oktatas/targyak/8498/CIC_ppt.pdf, accessed in Apr. 18, 2019, 45 pages.
Alan V. Oppenheim et al., "Discrete-Time Signal Processing", 2010 Pearson, p. 412.
"The LMS Algorithm," Adaptive Algorithms and Structure Part III, Adaptive Signal Processing, Widrow et al., Prentice-Hall, 1985, pp. 99-103.
"A delayless adaptive IFIR filterbank structure for wideband and narrowband active noise control," by K. Rajgopal et al., ScienceDirect, Signal Processing 86 (206), pp. 3421-3431, www.elsevier.com/locate/sigpro.
Transactions Briefs, "Design of Optimal Nyquist, Partial Response, Nth Band, and Nonuniform Tap Spacing FIR Digital Filters Using Linear Programming Techniques," by J.K. Liang et al., IEEE Transactions on Circuits and Systems, vol. CAS-31, No. 4, Apr. 1985, pp. 386-392.
The Filtered-x LMS Algorithm, L. Hakansson, Department of Telecommunications and Signal Processing, University of Karlskrona/Ronneby, 372 25 Ronneby, Sweden, 6 pages.
"The active control of sound," by S. J. Elliott et al., Electronics & Communication Engineering Journal, Aug. 1990, pp. 127-136.
Wikipedia, Super Audio CD, Graph / https://en.wikipedia.org/wiki/Pulse-code_modulation / CC BY-SA 3.0—Google S . . . found Jun. 12, 2019, pp. 1-4.
US Notice of Allowance, U.S. Appl. No. 16/407,247, Applicant: Hughes et al., Mail date: Jan. 17, 2020, 12 pages.
US Notice of Allowance, U.S. Appl. No. 16/407,250, Applicant: Hughes et al., Mail date: Jun. 2, 2020, 9 pages.
US Notice of Allowance, U.S. Appl. No. 16/407,242, Applicant: Hughes et al., Mail date: Jan. 8, 2020, 12 pages.
US Notice of Allowance, U.S. Appl. No. 16/407,254, Applicant: Hughes et al., Mail date: Mar. 1, 2022, 6 pages.
US Notice of Allowance, U.S. Appl. No. 16/407,232, Applicant: Hughes et al., Mail date: Nov. 2, 2020, 11 pages.
US Notice of Allowance, U.S. Appl. No. 16/407,227, Applicant: Hughes et al., Mail date: Jan. 21, 2020, 13 pages.
US Notice of Allowance, U.S. Appl. No. 16/407,227, Applicant: Hughes et al., Mail date: Jun. 5, 2020, 11 pages.
US Office Action, U.S. Appl. No. 16/407,250, Applicant: Hughes et al., Mail date: Feb. 4, 2020, 14 pages.
US Office Action, U.S. Appl. No. 16/407,254, Applicant: Hughes et al., Mail date: Apr. 30, 2021, 28 pages.
US Office Action, U.S. Appl. No. 16/407,254, Applicant: Hughes et al., Mail date: Oct. 19, 2021, 7 pages.
US Office Action, U.S. Appl. No. 16/407,232, Applicant: Hughes et al., Mail date: Jun. 9, 2020, 25 pages.

* cited by examiner

ACTIVE NOISE CANCELLATION SYSTEM

TECHNICAL FIELD

The present disclosure relates to an active noise cancellation system and to a method for cancelling noise. In particular, the present disclosure relates to a low-power active noise cancellation system.

BACKGROUND

Headset Active Noise Cancellation (ANC) enables cancellation of unwanted local environmental acoustic noise, creating the impression of a quiet ambient environment for listeners, whilst optionally leaving desired music/audio signals to be heard without signal degradation. ANC is achieved by producing audio signals with equal amplitude but opposite phase to the ambient noise at the listeners' ear using the principle of destructive wave interference to cancel unwanted extraneous noise. A typical application field of the ANC operation are the various types of headphones distinguished by the type of fitting on the listener's ear: in-ear, on-ear and over-ear.

There are typically two types of ANC: feedback (FB) ANC and feedforward (FF) ANC. A FB ANC system has microphones placed inside the headset in close proximity to the speaker driver, capturing soundwaves close to the eardrum. FF ANC system microphones are situated externally on the headset, capturing ambient noise before it passes through the headset to the eardrum. In addition, these two designs can be combined to produce a hybrid ANC system which has superior overall performance to either FB or FF ANC systems individual performance.

Current ANC systems use equalization filters implemented as fixed filters which do not change their gain and phase characteristics over time. or adaptive filters which can continually change their gain and phase characteristics to optimize ANC performance.

The fixed implementation reduces power consumption which is important for applications such as True Wireless Stereo headsets having very small battery capacity. However, fixed filters have several disadvantages including i) sub optimal performance when the listening environment is different from the engineering development/tuning environment; ii) the need for time consuming tuning process necessitating acquiring laboratory measurements and tuning the ANC filters; iii) production line calibration requirements to ensure matching for variability in component tolerance; iv) no provision for compensation for temperature variations or ageing components.

SUMMARY

It is an object of the disclosure to address one or more of the above mentioned limitations.

According to a first aspect of the disclosure, there is provided an active noise cancellation system comprising a transducer; a first microphone; and a first adaptive filter coupled to a calculator; the calculator being configured to generate an error signal based on a difference between a filtered input signal and a signal from the first microphone, wherein the filtered input signal is based on a first transfer function estimate of the transducer-to-first microphone transfer function via a first acoustic path, to update coefficients of the first adaptive filter using the error signal, and to generate with the first adaptive filter a first noise-cancellation signal.

For instance the transducer may be a speaker and the first microphone may be a feedback microphone.

Optionally, the coefficients are updated at an update rate and wherein the calculator is configured to adjust the update rate.

Optionally, the adaptive filter coefficients are updated at a lower rate than a sampling rate.

Optionally, the calculator is configured to estimate the first transfer function of the transducer-to-first microphone transfer function via the first acoustic path.

Optionally, the calculator comprises an estimator digital filter configured to estimate the first transfer function and to provide the filtered input signal.

Optionally, the calculator comprises a set of digital filters arranged along several paths to update the first adaptive filter.

Optionally, wherein each digital filter in the set of digital filters is identical to the estimator digital filter.

Optionally, at least one of the first adaptive filter and the estimator digital filter is a sparse filter in which filter taps are divided in subsets of filter taps.

Optionally, wherein sparse filter coefficients corresponding to specific subsets of filter taps are set to zero.

Optionally, the calculator is configured to estimate the first transfer function using an adaptive algorithm.

Optionally, wherein the adaptive algorithm comprises at least one of a Normalised Least Mean Squares algorithm and a filtered-x Least Mean Squares algorithm.

Optionally, the active noise cancellation system comprises a second microphone; and a second adaptive filter coupled to the calculator; the calculator being configured to update coefficients of the second adaptive filter using the error signal, and to generate with the second adaptive filter a second noise-cancellation signal.

For instance the second microphone may be a feedforward microphone.

Optionally, the calculator comprises another estimator digital filter configured to estimate a second transfer function, wherein the second transfer function estimate is an estimate of the transducer-to-second microphone transfer function via a second acoustic path.

Optionally, wherein the calculator is configured to generate a second error signal based on a difference between a second filtered input signal and a signal from the second microphone, wherein the second filtered input signal is based on the second transfer function estimate.

Optionally, the calculator is configured to update coefficients of the second adaptive filter using the second error signal.

Optionally, wherein the system is operable in two stages: a first stage to update the coefficients of the first adaptive filter, and a second stage to use the first adaptive filter as fixed filter.

For instance the system may implement the first stage and the second stage alternatively (first stage/second stage). The system may also implement the first stage at a predefined rate for instance once every N iterations, in which N is an integer.

According to a second aspect of the disclosure, there is provided an audio device comprising an active noise cancellation system according to the first aspect.

According to a third aspect of the disclosure there is provided a method for cancelling noise, the method comprising providing a transducer, a first microphone and a first adaptive filter; generating an error signal based on a difference between a filtered input signal and a signal from the first microphone, wherein the filtered input signal is based on a first transfer function estimate of the transducer-to-first microphone transfer function via a first acoustic path, updating coefficients of the first adaptive filter using the error signal, and generating with the first adaptive filter a first noise-cancellation signal.

Optionally, the method comprises estimating the first transfer function of the transducer-to-first microphone transfer function via the first acoustic path. According to a fourth aspect of the disclosure there is provided a computer-readable data carrier having stored thereon instructions which when executed by a computer cause the computer to generate an error signal based on a difference between a filtered input signal and a signal from a first microphone, wherein the filtered input signal is based on a first transfer function estimate of the transducer-to-first microphone transfer function via a first acoustic path, update coefficients of the first adaptive filter using the error signal, and generate with the first adaptive filter a first noise-cancellation signal.

The options described with respect to the first aspect of the disclosure are also common to the second, third and fourth aspects of the disclosure.

BRIEF DESCRIPTION OF THE DRAWINGS

The disclosure is described in further detail below by way of example and with reference to the accompanying drawings, in which.

DESCRIPTION

Figure 1:
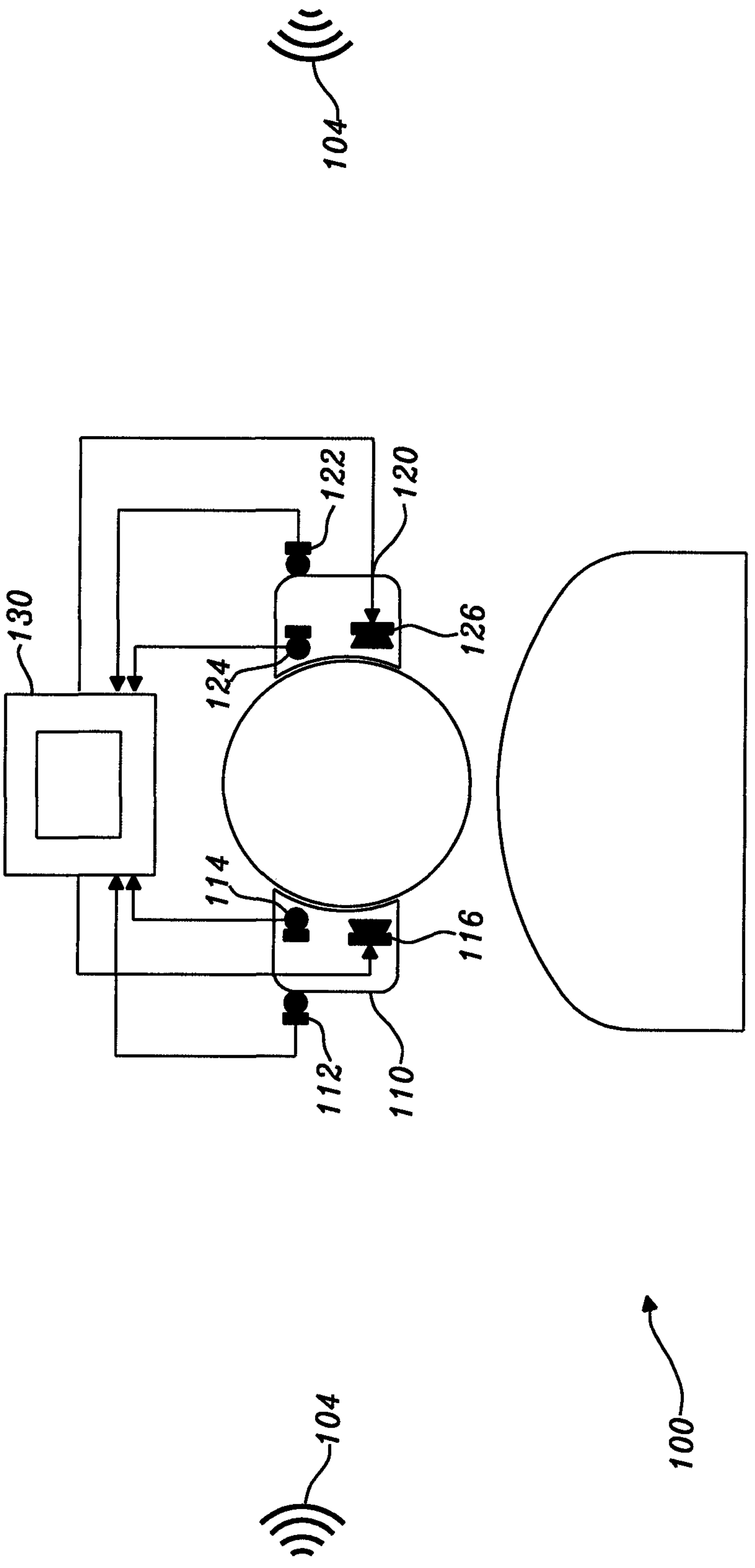
FIG. 1 is a diagram of an audio device or system provided with active noise cancellation ANC.

FIG. 1 is a schematic diagram of an audio device or system provided with active noise cancellation ANC. The system 100 comprises a left headphone cup 110, a right headphone cup 120 and a processing unit 130 for performing ANC. The left headphone cup includes a left feedback microphone 114 and a left speaker 116. In addition a feedforward microphone 112 is placed externally to the left headphone cup 110. Similarly the right headphone cup includes a right feedback microphone 124 and a right speaker 126. A right feedforward microphone 122 is placed externally to the right headphone cup 120. The processing unit 130 is coupled to the four microphones and to the two speakers to implement a so-called active noise cancellation system (ANC). The active noise cancellation system aims at reducing the environmental noise 104 experienced by the user of the audio system by generated an anti-noise signal. The processing unit 130 may be integrated as part of the headphone cups 110 or 120 or both.

In operation, the feedforward microphone 112 detects the environmental noise signal 104. The output of the microphones 112 is sent to the processing unit 130 to be inverted. The processing unit 130 then generates a feedforward anti-noise signal provided via the speaker 116. The feedback microphone 114 detects an audio signal inside the headphones cup 110, at the user's ears. The output of the microphone 114 is sent to the processing unit 130 and compared with the environment signal detected by the microphone 112 and the difference is used to create a feedback anti-noise signal. The anti-noise signal is a combination of the feedback and feedforward anti-noise signals. When mixed with the environment signal, the anti-noise signal achieves noise cancellation. Such an operation is mirrored by the microphones 122 and 124 and speaker 126 on the right side of the audio system.

The environment signal detected by the feedforward microphones 112 and 122 and the noise signal detected by the feedback microphones 114 and 124 are different as they travel along different acoustic paths. As a result complex signal processing of the anti-noise signal(s) is necessary in order to achieve optimal noise suppression at the user's ears. For example, the ANC might have to account for attenuation and phase shift experienced by the environmental noise signal when travelling through the headphone cups and/or for noise introduced in the anti-noise signal by the electrical components of the processing unit itself, such as quantization noise. The microphones 112, 114, 122 and 124 may be analog or digital microphones.

Figure 2:
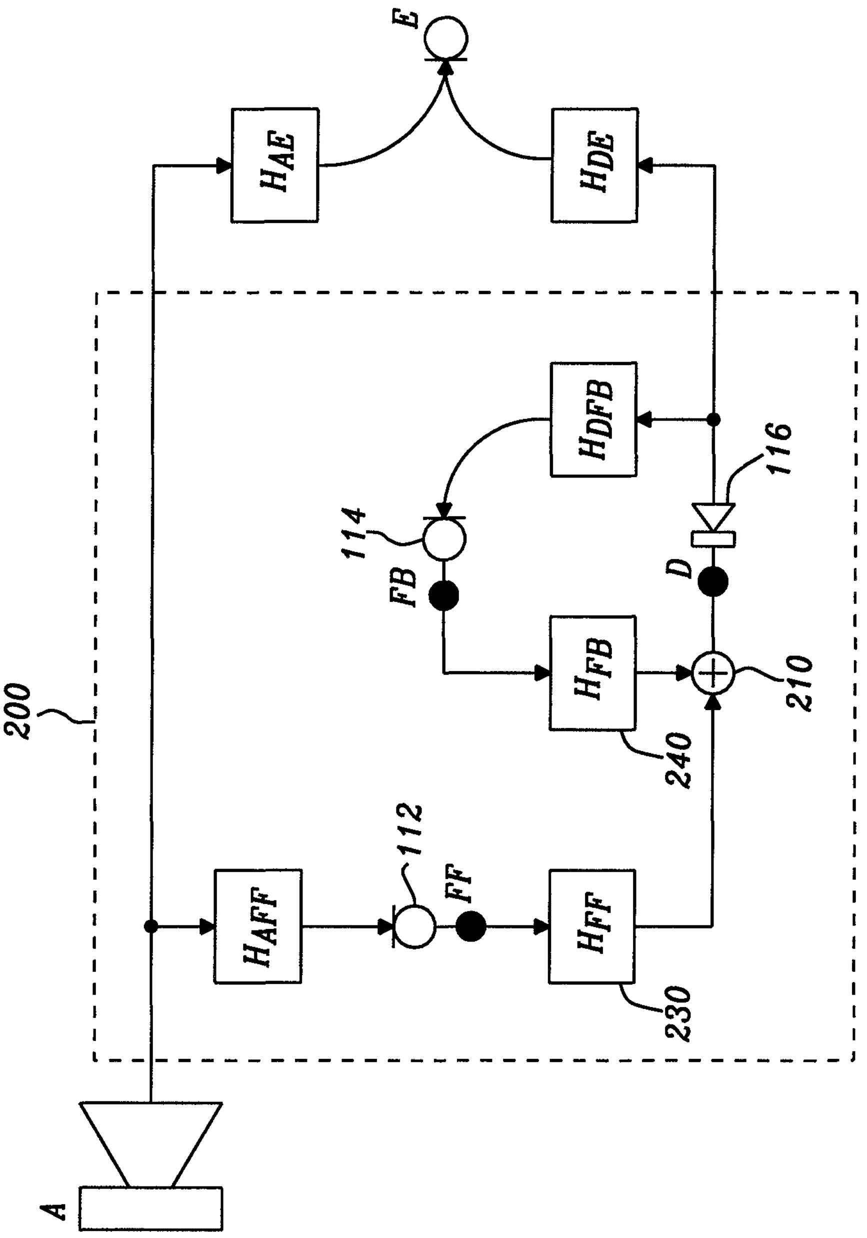
FIG. 2 a diagram of a conventional hybrid ANC channel for use in an audio device.

FIG. 2 is a schematic diagram of a conventional hybrid ANC headset. The circuit 200 is shown between a source of acoustic signal providing a signal A which may include sound and noise, and the ear E of a user. The circuit 200 corresponds to the left headphone cup of diagram 100 and the same reference numbers have been used to represent corresponding features. The circuit 200 includes a feedforward microphone 112 coupled to an ambient to feedforward microphone acoustic transfer function $H_{AFF}$ (it is not modelled internally and represents the path from the noise source A and the feedforward microphone 112), a feedback microphone 114 coupled to a drive to feedback transfer function $H_{DFB}$, a speaker 116 coupled to a speaker driver D and an adder 210. Two equalization filters are also provided: a feedforward filter $H_{FF}$ 230 and a feedback filter $H_{FB}$ 240. The human ear filters $H_{DE}$ and $H_{AE}$ represent the speaker to human ear filter, and the acoustic signal to human ear filter $H_{AE}$, respectively.

The circuit 100 can be implemented in either analogue or digital form; however, digital implementation is cheaper to produce and provides greater flexibility.

The current practice is to implement the equalization filters $H_{FF}$ and $H_{FB}$ as fixed filters which do not change their gain and phase characteristics over time as opposed to adaptive filters which can continually change their gain and phase characteristics to optimize ANC performance. The fixed implementation reduces power consumption which is important for applications such as True Wireless Stereo headsets having very small battery capacity. However, fixed filters have several disadvantages as follows. Firstly, the ANC performance is sub optimal when the listening environment is different from the engineering development/tuning environment. This is almost always the case due to differences in the incident angle of the unwanted noise and the anatomy of the headphone wearer. Secondly fixed filters require a time consuming tuning process (of the ANC filters) based on acquiring laboratory measurements. Thirdly, fixed filters require production line calibration to ensure compensating for variability in component tolerance. Successful ANC performance requires accurate equalization of gain and phase to within a few tenths of dB and a few degrees. Finally, fixed filters do not provide for compensation for temperature variations or component ageing.

Figure 3:
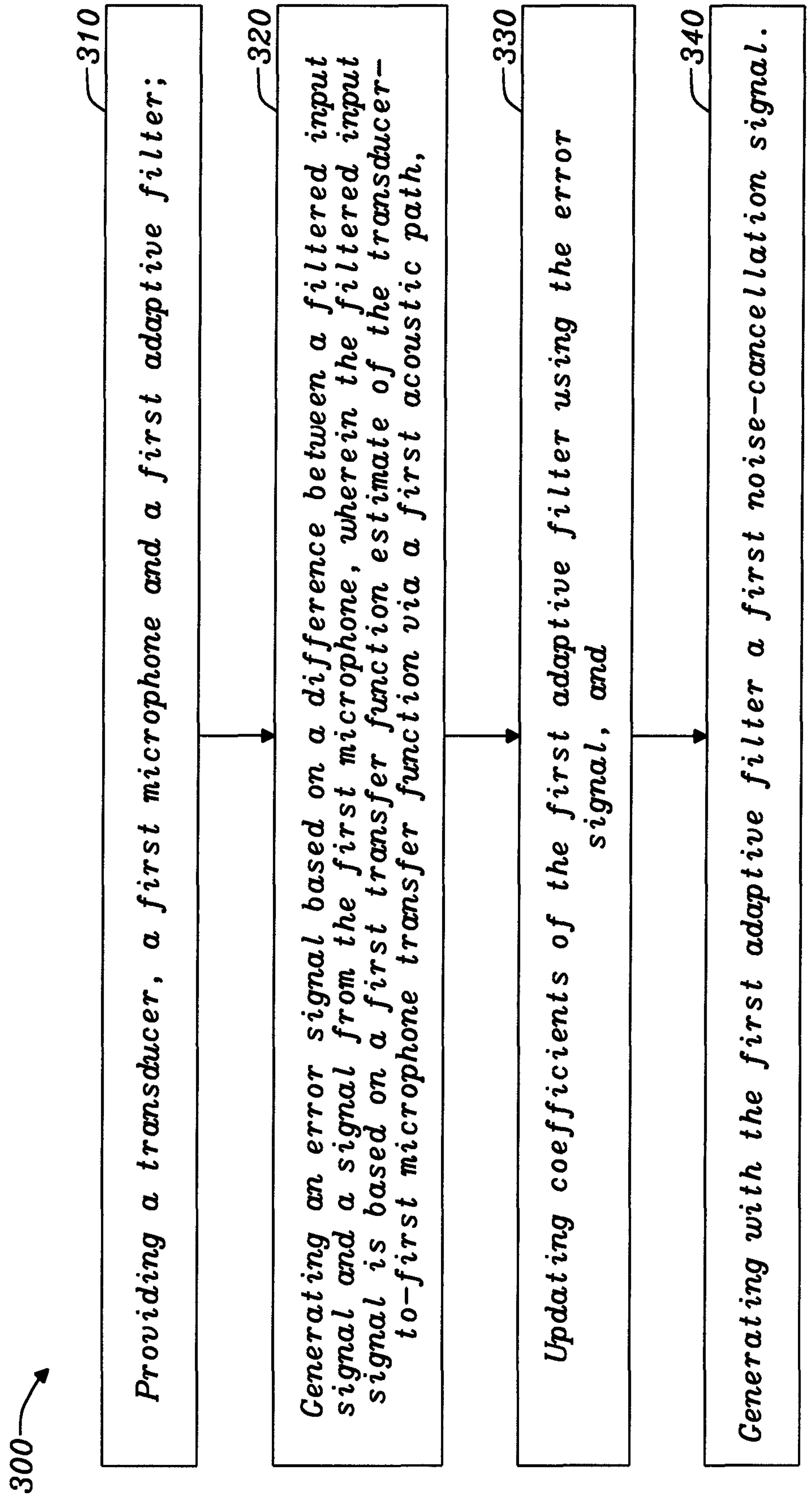
FIG. 3 is a flow chart of a method for cancelling noise according to the disclosure.

FIG. 3 is a flow chart of a method for performing noise cancellation.

At step 310 a transducer, a first microphone and a first adaptive filter are provided. For instance the transducer may be adapted to transform an electrical signal into an acoustic signal such as a speaker.

At step 320 an error signal is generated. The error signal is based on a difference between a filtered input signal and a signal from the first microphone. The filtered input signal is based on a first transfer function estimate of the transducer-to-first microphone transfer function via a first acoustic path.

The input signal can be any audio signal that is intended for playback on the headset worn by the user, including music, speech from telephone call etc. The input signal may be filtered using a digital filter with coefficients updated using an adaptive algorithm such as the normalised least mean squares algorithm to determine the transfer function estimate.

At step 330, the coefficients of the first adaptive filter are updated using the error signal.

At step 340 a first noise-cancellation signal is generated with the first adaptive filter.

The method may also include the step of estimating the first transfer function of the transducer-to-first microphone transfer function via the first acoustic path.

The method 300 may be implemented with a system having one or more adaptive pathways such as feedforward, feedback or a combination of both feedforward and feedback pathways.

Figure 4:
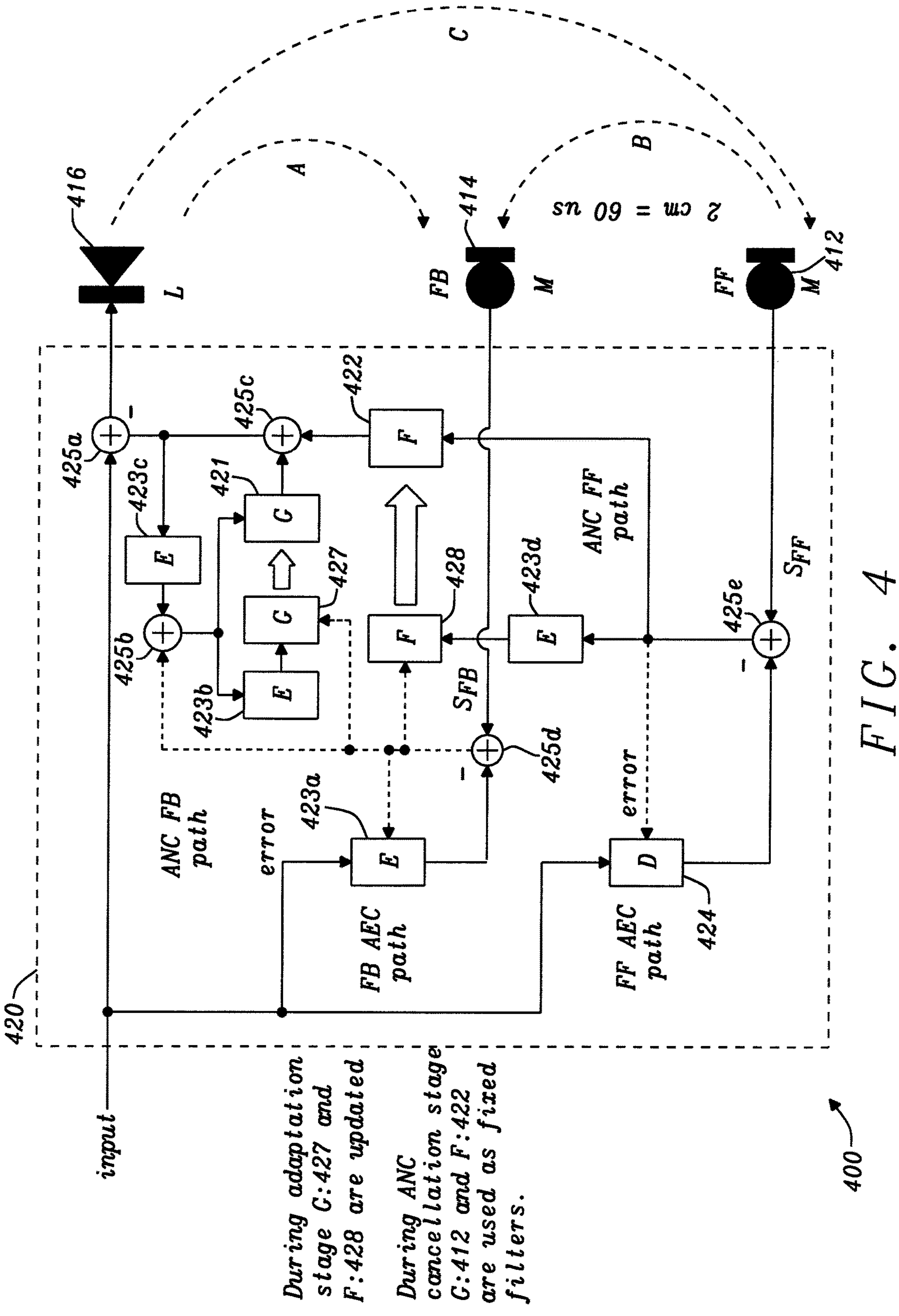
FIG. 4 is a diagram of an ANC system according to the disclosure.

FIG. 4 is a diagram of an ANC headset according to the disclosure. The ANC headset 400 includes a feedforward microphone 412, a feedback microphone 414, a speaker 416 coupled to an ANC module 420. The ANC module 420, also referred to as ANC controller, includes two adaptive filters 421 and 422 coupled to a calculator adapted to calculate the coefficients of the adaptive filters. The filter F 422 is a feedforward adaptive filter for generating feedforward anti-noise signal, and the filter G 421 is feedback adaptive filter for generating a feedback anti-noise signal. Once the adaptive filters F and G have been updated, the feedback and the feedforward anti-noise signals are added using adder 425*c* to generate the anti-noise signal. The anti-noise signal is then subtracted from the input acoustic signal by combiner 425*a*.

The ANC module/controller 420 could be implemented as a software module or as a digital circuit or as a combination of both software and digital circuitry.

In FIG. 4 the ANC module 420 is implemented as a digital circuit comprising a first set of digital filters labelled 423*a*, 423*b*, 423*c* and 423*d*, another digital filter 424 and five combiners or adders labelled 425*a*, 425*b*, 425*c*, 425*d* and 425*e*. The digital filter 423*a* is an adaptive filter that can be updated, while the digital filters 423*b*, 423*c* and 423*d* are copies of the filter 423*a*. The digital filters 423*a*, 423*b*, 423*c* and 423*d* may be implemented as a set of identical Finite Impulse Response (FIR) filters, that is having the same order and same coefficients. The digital filters 424, 427, 428, 421 and 422 may also be implemented as FIR filters.

The circuit 400 operates in two stages: a first stage, also referred to as adaptation stage, to update the coefficients of the adaptive filters 427 G and 428 F, and a second stage, also referred to as filtering or ANC cancellation stage, for using the filters 421 G and 422 F as fixed filters in the respective ANC paths. The system may implement the first stage and the second stage alternatively ($1^{st}$ stage/$2^{nd}$ stage/$1^{st}$ stage/$2^{nd}$ stage/ . . . ). The system may also implement the first stage at a predefined rate for instance once every N iterations, in which N is an integer.

For example ($1^{st}$ stage/$2^{nd}$ stage/$2^{nd}$ stage/$2^{nd}$ stage/$1^{st}$ stage/ . . . ).

The ANC system may be configured to reduce independently the adaptive filter update rate in any path, for instance the FF path or the FB path, to reduce computational complexity and save power. The adaptive filter update rate and the ANC filtering rate can be independent relative to each other and independent for each pathway. This can be optimised such that the update rate is fast enough to track the changes in the acoustic scene whilst being lower than the system sampling rate. This can result in significant additional power saving.

The sampling rate Fs may vary within a specific range, for instance between 96 kHz to 768 kHz. The input signal can be any audio signal that is intended for playback on the headset worn by the user, including music, speech from telephone call etc.

The digital filter 423*a*, also referred to as first estimator, is configured to determine an estimate E of the speaker (L) 416 to feedback microphone M(FB) 414 transfer function via the acoustic path A, such that:

$$E=L\widehat{AM}_{FB} \tag{1}$$

The purpose of the digital filter E 423*a* is to remove any component of the input signal which reaches the FB microphone 414. In the first stage the digital filter 423*a* receives the input signal and provides an output signal which is a filtered (convolved) input signal representing an estimate of the microphone signal received at feedback microphone 414. The feedback microphone M(FB) 414 provides a signal $S_{FB}$ that represents the input signal convolved with $LAM_{FB}$, and the combiner 425*d* subtracts the output of 423*a* from $S_{FB}$ to obtain an error signal shown as the ANC FB path. If E is a good match for the estimate of $L\widehat{AM}_{FB}$, then the output of 423*a* and $S_{FB}$ will be the same; i.e. represent the input signal having been filtered with the estimate of the forward path, E, and the input signal filtered by the physical forward path, LAM.

When E has been adapted correctly the only component of the error signal is the noise present at 414 which forms the input to both the adaptive and the fixed FB processing paths. The error signal is then sent to various part of the circuit. The error signal is feedbacked into the digital filter 423*a* for updating the estimate E. The error signal is also sent to the adaptive digital filters 427 and 428 for updating their respective coefficients. The ANC FB path error signal is also combined, via the combiner 425*b*, with an estimate of the ANC signal at the FB microphone 114 provided by the digital filter 423*c*.

The output of the combiner 425*b* representing any remaining error is fed to the digital filter 423*b*. The digital filter 423*b* is used to ensure the time alignment of the input signal (via filtering through 423*b*) with the error signal. The output of the digital filter 423*b* is then used to update the coefficients of the adaptive filter 427. Therefore, the estimate of G 427 is updated in the feedback ANC path.

The adaptive filter 423*a* can be updated on every sample iteration if there is an input signal present. It must be adapted initially to give an estimate of LAM at start time, but optionally can continually adapt. The values of 423*b*, 423*c* and 423*d* will always be the same as E on any given sample iteration. The filters 423_b_, 423_c_ and 423_d_ are not used until E is calculated so their initial state is unimportant but should preferably match the initial state of E for consistency.

Similar to the digital filter E 423_a_, the purpose of the digital filter D 424 is to remove any component of the input signal which reaches the FF microphone 412. The need for D depends on the headphone design and consequently the amount of sound leakage of the input signal via the speaker 416 to the FF microphone 412.

The digital filter 424 is configured to determine an estimate D of the speaker (L) 416 to feedforward microphone M(FF) 412 transfer function via the acoustic path C (See equation 5 below).

The digital filter 424 receives the input signal and provides an output signal which is a filtered (convolved) input signal representing an estimate of the microphone signal received at feedforward microphone 412. The feedforward microphone M(FF) 412 provides a signal $S_{FF}$ and the combiner 425_e_ subtracts the input signal filtered using 424 from $S_{FF}$ to remove any input residue signal from $S_{FF}$ and obtain an error signal shown as the ANC FF path. If input*D=input*$LCM_{FF}$, (see equation 5 below) then all the input residues will be removed.

The output of 425_e_ is the FF microphone signal with any input residue removed. When D has been adapted correctly the only component of the signal is the noise present at 412 which forms the input to both the adaptive and the fixed FF processing paths. The error signal is fed back into the digital filter 424 to update D. The error signal is also sent to the digital filter 423_d_.

The output of the digital filter 423_d_ is then used to update the coefficients of the adaptive filter F 428. Then in the second stage the adaptive filter 421 G and the adaptive filter 422 F are used directly as fixed filters.

The transfer function estimate E can be determined using various methods. For instance E can be determined via an adaptive algorithm, such as the Normalised Least Mean Squares (NLMS), (See B. Widrow and S. D. Stearns. Adaptive Signal Processing. Prentice-Hall, 1985.) The use of NLMS can be generalised to any method to perform system identification of the unknown plant LAM.

Using this approach the error at each sampling interval k can be expressed as:

$$\text{error}(k)=\text{Input}^T(k)\cdot LAM_{FB}(k)-\text{Input}^T(k)\cdot E(k) \tag{2}$$

In which the term ($\text{Input}^T(k)\cdot LAM_{FB}(k)$) represents the signal $S_{FB}$ from microphone 414, and ($\text{Input}^T(k)\cdot E(k)$) represents the output of the digital filter 423_a_, hence the input signal filtered using the digital filter 423_a_.

With Input(k)=[input(k), input(k−1), . . . , input $(k-M+1)]^T$, where M is the number of taps in the FIR filter and $\text{Input}^T(k)\cdot LAM_{FB}(k)$ is the vector inner product of $\text{Input}^T(k)$ and $LAM_{FB}(k)$.

$$E(k)=[e_0(k),e_l(k-1),\ldots,e_{M-1}(k)]^T \tag{3}$$

E(k) is a Finite Impulse Response (FIR) filter with coefficients updated using the NLMS algorithm according to:

$$E(k+1)=E(k)+\frac{\text{error}(k)\text{Input}(k)}{\text{input}^T(k)\text{input}(k)} \tag{4}$$

It is also possible there may be leakage from the loudspeaker, L, to the feedforward microphone M (FF). The digital filter 424 is configured to determine an estimate D of the speaker (L) 416 to feedforward microphone M(FF) 412 transfer function via the acoustic path C, such that:

$$D=L\widehat{CM}_{FF} \tag{1}$$

The circuit 400 of FIG. 4 is implemented using both a feedback path and a feedforward path, however it will be appreciated that the circuit 400 may also be implemented using only the forward path or only the feedback path. In this case the combiner 425_c_ would not be necessary. Therefore the proposed architecture supports feedback, feedforward, or a combination of both (hybrid) ANC configurations. Once the transfer function E has been estimated it may be used in whichever feedforward and/or feedback block required. This enables either or both the feedforward and feedback adaptive components to operate.

Figure 5:
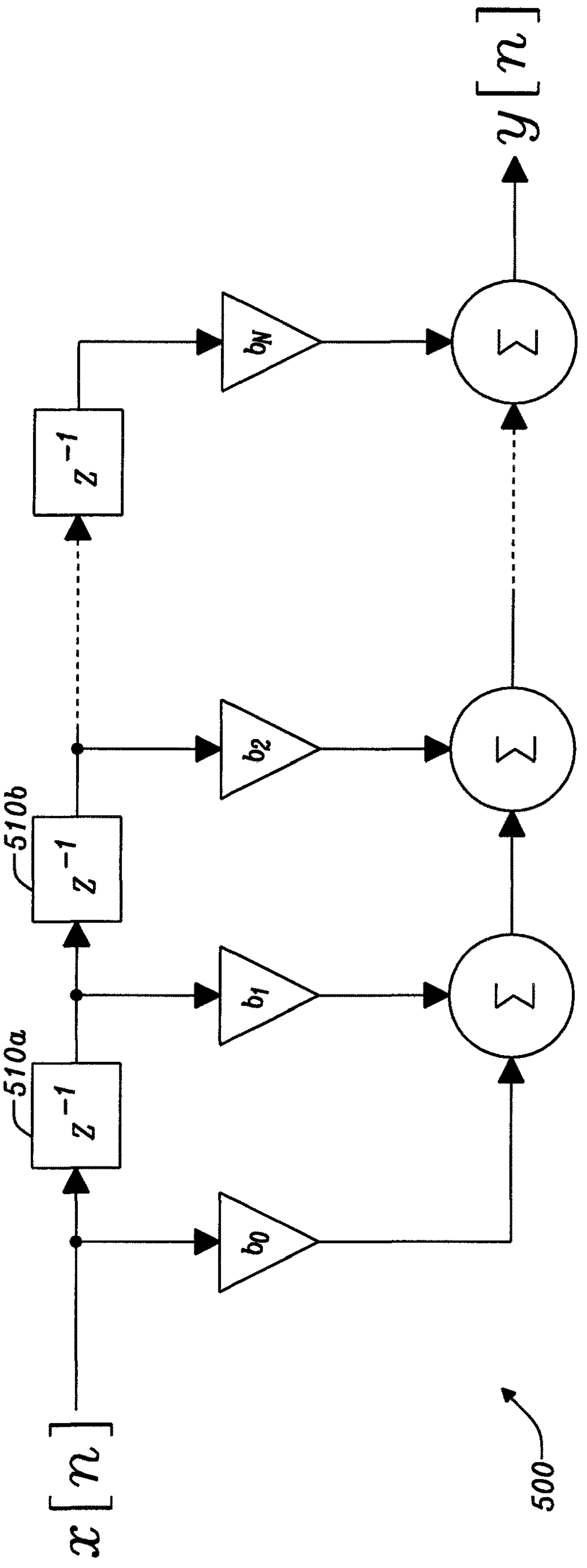
FIG. 5 is a schematic diagram of a digital filter.

FIG. 5 is a schematic diagram of a digital filter. The digital filter 500 is a FIR filter of order N having N unit delays 510 in which $Z^{-1}$ is the $Z^{-1}$ operator in Z transform; and a series of N filter coefficients $b_0$-$b_N$. The output of the $y[n]=b_0x[n]+b_1x[n-1]+\ldots+b_Nx[n-N]$ in which $x[n-i]$ are referred to as taps.

A conventional adaptive algorithm such as the NLMS algorithm may lead to some instability due to the phase shift (delay) introduced by the forward path LAM. The well-known filtered-x LMS-algorithm is, however, an adaptive filter algorithm which is suitable for active control applications.

Figure 6A:
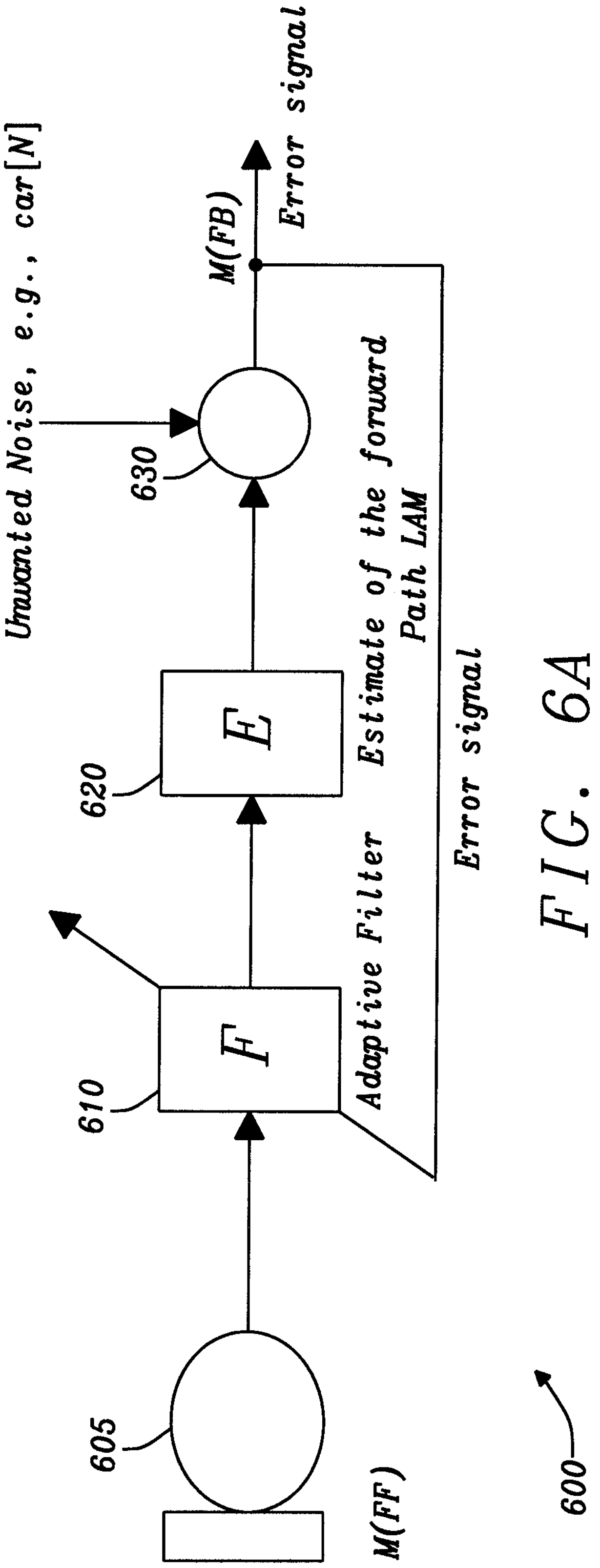
FIG. 6A is a diagram of an active control system based on the filtered-x LMS algorithm.

FIG. 6A shows an active control system with a controller based on the filtered-x LMS algorithm as described in "Active Control of Sound", P. A. Nelson and S. J. Elliott; Academic Press, Inc, 1992; and "The Filtered-x LMS Algorithm" by L. Hakansson, University of Karlskrona, Sweden, 2004.

FIG. 6A illustrates the feedforward case in which a model of the dynamic system between the filter output, F, and the forward path estimate, LAM, is introduced between the microphone input signal, M(FF), and the algorithm for the adaptation of the coefficient vector.

The adaptive filter F 610 is coupled to the digital filter E 620. The output of the digital filter 620 is an estimate of the anti-noise signal that will be received at the FB microphone (414) (forward path estimate LAM).

A combiner 630 receives the output of the digital filter 620 and an ambient noise signal and generates an error signal. The error signal is the difference between the actual noise signal present at the FB microphone 414 and the anti-noise signal generated by 400, output at 416, then received at the microphone 414.

The error signal is used in the least mean squares algorithm to change the filter coefficients of the FIR filter F 610 to minimise the square of the error signal. The adaptive filter F 610 receives a signal from the feedforward microphone 605, and provides its output to the digital filter E 620. The output of the adaptive filter F 610 is the estimated anti-noise signal at the FB microphone. This signal is used for the estimate of the adaptive filter coefficients.

The adaptive filter coefficients in the adaptive filter F are updated in the same way as those of E in the above description, namely:

$$M_{FB}=N+M_{FF}\cdot F\cdot LAM_{FB} \tag{2}$$

Therefore at each sampling interval, k $$M_{FB}(k)=N^T(k)+M_{FF}^{\ T}(k)\cdot F(k)LAM_{FB}(k) \tag{3}$$

Where $LAM_{FB}(k)$ is modelled by E(k). Consequently, the coefficients of the FIR filter are updated using the NLMS according to:

$$F(k+1) = F(k) + \frac{M_{FB}(k)M_{FF}(k)}{M_{FF}^T(k)M_{FF}(k)} \quad (4)$$

Figure 6B:
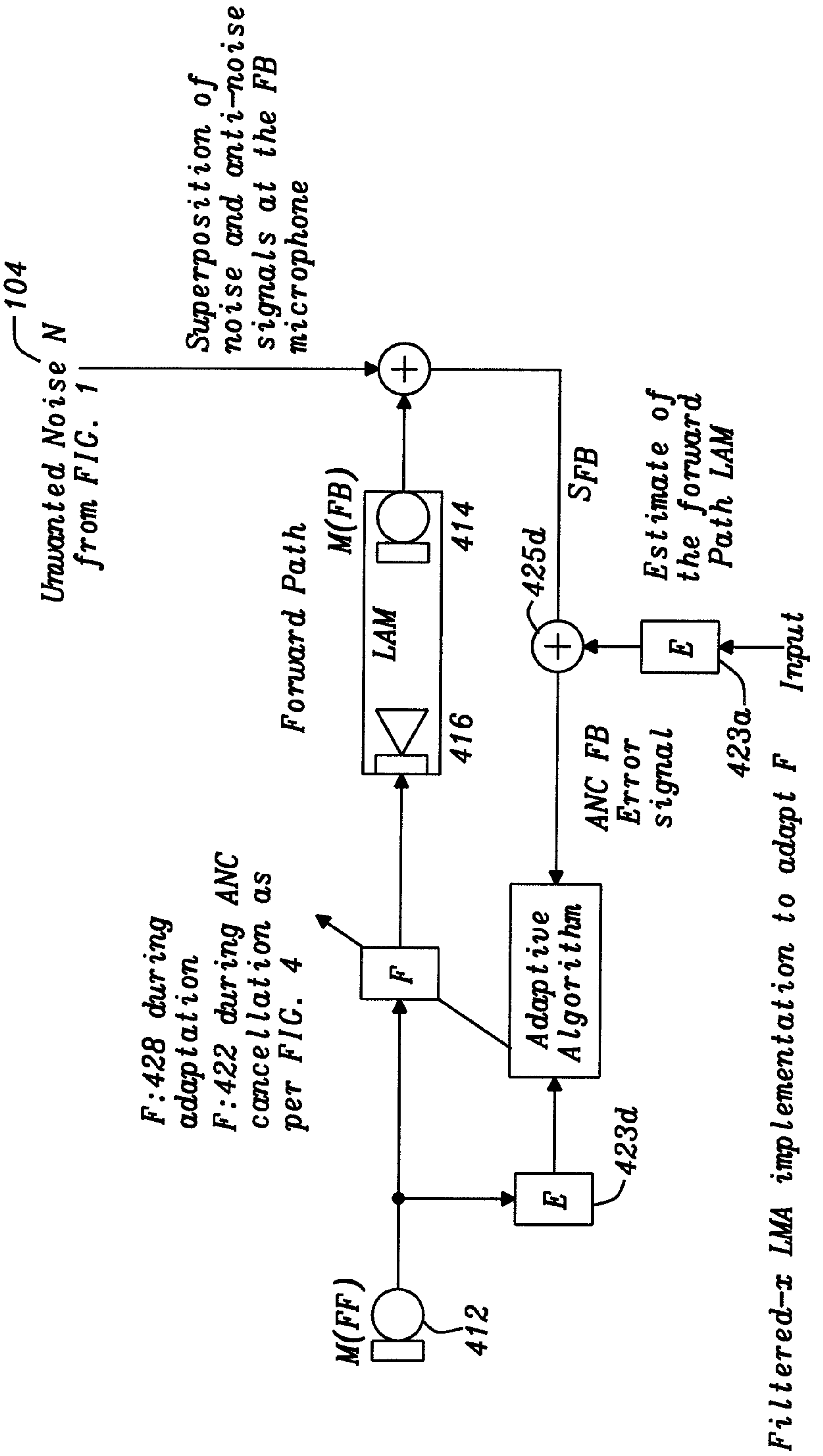
FIG. 6B is a diagram of another ANC headset according to the disclosure.

FIG. 6B is a diagram of another ANC headset according to the disclosure.

The diagram of FIG. 6B is similar to diagram of FIG. 4 (forward path) using the principle described in FIG. 6A. The same reference numerals have been used to represent corresponding components and their description will not be repeated for sake of brevity.

Like in in FIG. 4, the feedforward microphone path starting, from the FF microphone 412, produces a feedforward anti-noise cancellation signal. This is achieved using the $S_{FB}$ signal from FB microphone 414 and the estimated transfer function LAM from the filter 423*a* to generate an error signal to drive the convergence of the feedforward ANC filter F 428.

The path from the feedback microphone is different for adaptation and ANC filtering. During adaptation of the digital filter F, the pathway goes through the adaptive algorithm is as shown in FIGS. 6A and 6B (F equivalent to 428 in FIG. 4). Once the updated version of the filter F has been created, the filter F (equivalent to 422 in FIG. 4) is used in the same sample iteration in the ANC FF path which does not include the estimate, E, of the driver/speaker to microphone path. The filter F is then equivalent to $H_{FF}$ 230 in FIG. 2.

If a feedback ANC component is present, then the adaptive filter coefficients in G (427) are updated in the same way as those of F in the feedforward description, namely:

$$M_{FB} = N + M_{FB} \cdot G \cdot LAM_{FB} \quad (5)$$

Therefore at each sampling interval, k $$M_{FB}(k) = N^T(k) + M_{FB}T(k) \cdot G(k) LAM_{FB}(k) \quad (6)$$

Where $LAM_{FB}(k)$ is modelled by E(k). Consequently, the coefficients of the FIR filter are updated using the NLMS according to:

$$G(k+1) = G(k) + \frac{M_{FB}(k)M_{FB}(k)}{M_{FB}^T(k)M_{FB}(k)} \quad (7)$$

The frequency of update, $F_{update}$, to the coefficients F and G can be less than the sampling rate, $F_S$, by an update reduction factor R such that:

$$F_{update} = \frac{F_s}{R} \quad (8)$$

The use of $F_{update}$ is optional; however, this provides a useful means to reduce computation by reducing the rate of updating F and G in equation 8 and 11.

The update reduction factor, R, is related to the stationarity (i.e position in 3D space and noise statistical characteristics) of the acoustic environment and the sampling rate $F_S$. Typically R will be higher in feedback than feedforward.

The ANC module/controller 420 may be implemented using low computational complexity filters, such as sparse filters. This approach permits to reduce computational complexity and save power. ANC requires low latency for good performance which corresponds to higher digital sample rates, F*S*. The use of higher sampling rates increases system power consumption as the filters have a greater number of coefficients and require updating at higher rates. The necessity for higher sampling rates, $F_S$, has the effect of increasing the bandwidth of the audio path; however, this is not necessary as the ANC cancellation frequency range is typically between 20 Hz and a few kHz.

Within a sparse filter, the coefficients are set such that most of them are 0, for example only every fourth coefficient might be non-zero. In the case of a filter which is being updated at a factor X lower than the sampling frequency, a filter can have only 1/X of its coefficients non-zero which allows some practical savings to be made in memory and processing.

The equation 13 below expresses the output y of an FIR filter of length N, where $x_n$ is the $n^{th}$ tap in a delay line and $c_n$ is the $n^{th}$ filter coefficient.

$$y = \sum_{n=0}^{N-1} x_n c_n \quad (13)$$

With X=4, equation 14 shows how this sum expands to exclude a large number of taps, meaning that many calculations can be skipped.

$$y = \sum_{n=0}^{N-1} x_0 c_0 + x_4 c_4 + x_8 c_8 + \ldots \quad (14)$$

As the tap line is updated with every new sample input to the filter, it becomes advantageous to store taps in X sub-arrays, such that samples separated by X other samples are contiguous in memory. This allows the same shortened filtering loop implementing equation 14 to be used for every input while keeping filter tap history intact and reducing the number of coefficients to be stored, as zero-valued coefficients are unused. Alternatively, a normal tap buffer can be used along with processing code which skips X samples when it loads the tap line from memory (uses a stride of X). In both cases, computational load is decreased due to storing and using fewer coefficients.

When the filter coefficients are updated at a lower rate than the sampling rate, the value X can be selected such that only one of the sub arrays in the tap line for the update step of the filter is required, saving further memory resources. As such, only the first sub array needs to be kept for the filter adaptation stage, as only one in X of the filtering steps is used.

Figure 7:
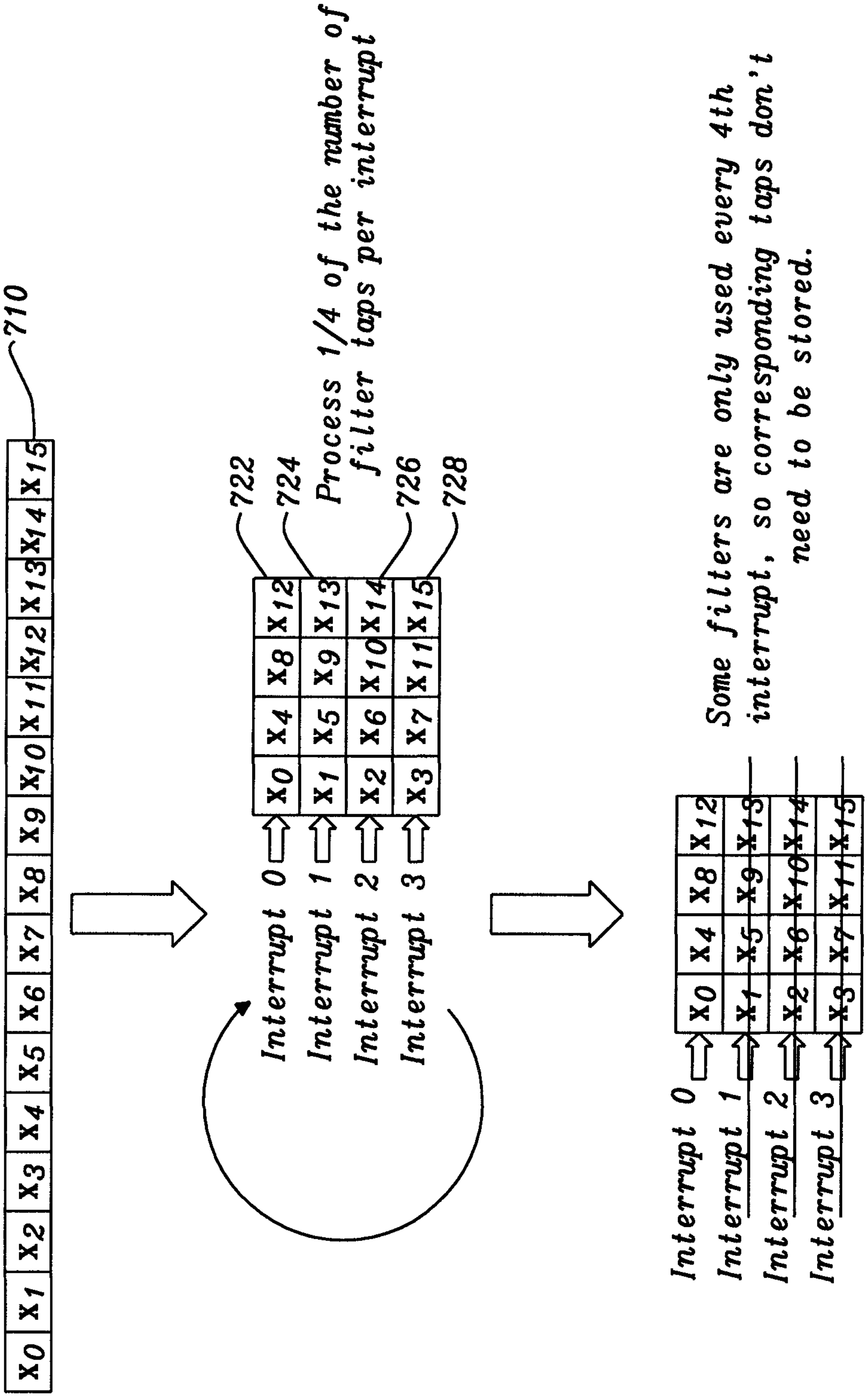
FIG. 7 is a diagram illustrating the working of a sparse filter.

FIG. 7 is a diagram illustrating the working of a sparse filter. FIG. 7 shows a tap line including 16 taps labelled $X_0$ to $X_{15}$. The tap line 710 can first be rearranged into sub-arrays, in this case four subarrays 722, 724, 726 and 728 which store all taps and allow reduced computational load to calculate the filter output. The filter then updates coefficients at a reduced sampling rate and does not need to store all taps.

A low-pass infinite impulse response (IIR) filter may be provided before the FIR filter, to prevent potential aliasing effects due to the system effectively subsampling data. For ANC use-cases this is not a problem because the desired audio bandwidth is low compared to the Nyquist frequency of the system.

Figure 8A:
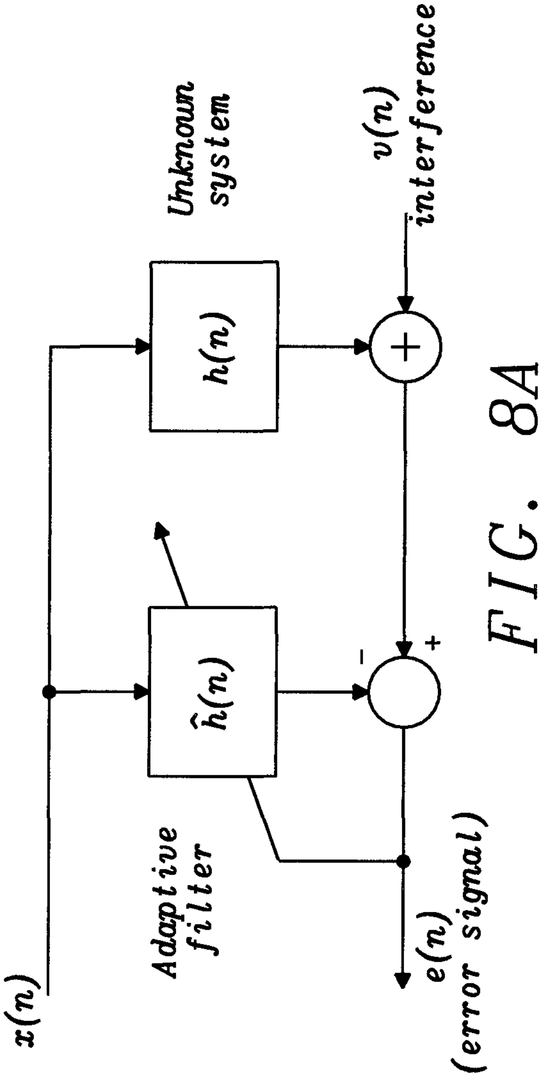
FIG. 8A is a diagram of an adaptive filter.

FIG. 8A shows a typical adaptive filter, where an unknown system with transfer function h(n) is estimated by the adaptive filter, resulting in the estimate $\hat{h}(n)$.

Figure 8B:
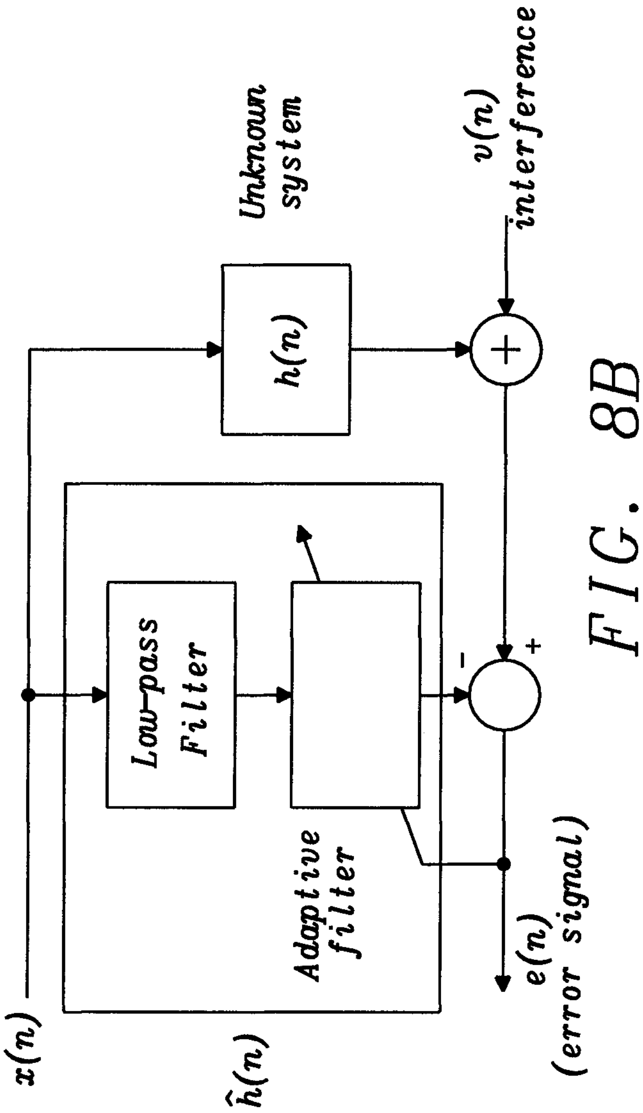
FIG. 8B is a diagram of a modified adaptive filter.

FIG. 8B shows the adaptive filter for use in the system of the disclosure in which the adaptive filter component is preceded by a low-pass filter. This technique works best with long FIR filters (typical with ANC filters at high sampling frequencies) where the savings made by reducing the FIR processing load more than compensate for some additional IIR pre-processing. Also, in an adaptive system, the FIR filter which the system converges upon will be affected by the transfer function of the IIR, most notably in the ANC case, the group delay. This results in the estimate $\hat{h}(n)$ being composed of the convolution of the low-pass filter transfer function and the adapted transfer function. The low-pass component must then be run at the original sampling rate of the system, not the lower rate obtained by dividing by X. Subsequent uses of the adapted transfer function $\hat{h}(n)$ in other parts of the system will be safe from aliasing effects due to the low-pass filter. In the case where some filters are only used every Xth interrupt and corresponding taps need not be stored, the taps which do need to be stored must be the output of the low-pass filter used in the adaptation step.

The system and method of the disclosure reduces the power consumption of adaptive ANC systems compared to the current state of the art and present several other advantages.

The system of the disclosure can adapt the gain and phase of the adaptive filter(s) to best match the noise direction and wearer's anatomy. The proposed system does not require laboratory-based acoustic measurements to be made. It is also self-calibrating at runtime as the filters are all adaptive at runtime. Consequently, any difference in gain and phase response between samples of the microphones, speakers or acoustics at the point of manufacture can be compensated for in the adaptive filters. For instance, a +−3 dB difference in microphone sensitivity at manufacture time could be compensated for with in the overall gain of the filter E, F and G. Similarly, the proposed system can compensate for temperature and ageing components at runtime.

The systems and methods of the disclosure may be implemented using a computer-readable data carrier or a computer readable medium having stored thereon instructions which when executed by a computer enables to act as the ANC module/controller presented above.

A computer program product may be stored on or transmitted as one or more instructions or code on a computer-readable medium. Computer-readable media includes both computer storage media and communication media including any medium that facilitates transfer of a computer program from one place to another. A storage media may be any available media that can be accessed by a computer. By way of example such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. The instructions or code associated with a computer-readable medium of the computer program product may be executed by a computer, e.g., by one or more processors, such as one or more digital signal processors (DSPs), general purpose microprocessors, ASICs, FPGAs, or other equivalent integrated or discrete logic circuitry.

A skilled person will therefore appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

What is claimed is:

1. An active noise cancellation system comprising
- a transducer;
- a first microphone;
- a first adaptive filter; and
- a calculator coupled to the first adaptive filter, wherein the calculator comprises a set of digital filters arranged along several paths to update the first adaptive filter; the calculator being configured
  - to generate an error signal based on a difference between a filtered input signal and a signal from the first microphone, wherein the filtered input signal is based on a first transfer function estimate of the transducer-to-first microphone transfer function via a first acoustic path,
  - to update coefficients of the first adaptive filter using the error signal, and
  - to generate with the first adaptive filter a first noise-cancellation signal;
  - wherein the calculator is configured to estimate the first transfer function of the transducer-to-first microphone transfer function via the first acoustic path; wherein the calculator comprises an estimator digital filter configured to estimate the first transfer function and to provide the filtered input signal; and
  - wherein the calculator is configured to estimate the first transfer function using an adaptive algorithm.

2. The active noise cancellation system as claimed in claim 1, wherein the coefficients are updated at an update rate and wherein the calculator is configured to adjust the update rate.

3. The active noise cancellation system as claimed in claim 1, wherein the adaptive filter coefficients are updated at a lower rate than a sampling rate.

4. The active noise cancellation system as claimed in claim 1, wherein each digital filter in the set of digital filters is identical to the estimator digital filter.

5. The active noise cancellation system as claimed in claim 1, wherein at least one of the first adaptive filter and the estimator digital filter is a sparse filter in which filter taps are divided in subsets of filter taps.

6. The active noise cancellation system as claimed in claim 5, wherein sparse filter coefficients corresponding to specific subsets of filter taps are set to zero.

7. The active noise cancellation system as claimed in claim 1, wherein the adaptive algorithm comprises at least one of a Normalised Least Mean Squares algorithm and a filtered-x Least Mean Squares algorithm.

8. The active noise cancellation system as claimed in claim 1, comprising
- a second microphone; and
- a second adaptive filter coupled to the calculator; the calculator being configured
  - to update coefficients of the second adaptive filter using the error signal, and
  - to generate with the second adaptive filter a second noise-cancellation signal.

9. The active noise cancellation system as claimed in claim 1, wherein the system is operable in two stages: a first stage to update the coefficients of the first adaptive filter, and a second stage to use the first adaptive filter as fixed filter.

10. An active noise cancellation system comprising a transducer; a first microphone; a first adaptive filter coupled to a calculator; the calculator being configured to generate an error signal based on a difference between a filtered input signal and a signal from the first microphone, wherein the filtered input signal is based on a first transfer function estimate of the transducer-to-first microphone transfer function via a first acoustic path, to update coefficients of the first adaptive filter using the error signal, and to generate with the first adaptive filter a first noise-cancellation signal;

a second microphone; and a second adaptive filter coupled to the calculator; the calculator being configured to update coefficients of the second adaptive filter using the error signal, and to generate with the second adaptive filter a second noise-cancellation signal, wherein the calculator comprises another estimator digital filter configured to estimate a second transfer function, wherein the second transfer function estimate is an estimate of the transducer-to-second microphone transfer function via a second acoustic path.

11. The active noise cancellation system as claimed in claim 10, wherein the calculator is configured to generate a second error signal based on a difference between a second filtered input signal and a signal from the second microphone, wherein the second filtered input signal is based on the second transfer function estimate.

12. The active noise cancellation system as claimed in claim 1, wherein the calculator is configured to update coefficients of the second adaptive filter using the second error signal.

13. An audio device comprising an active noise cancellation system as claimed in claim 1.

14. A method for cancelling noise, the method comprising providing a transducer, a first microphone, a first adaptive filter and a calculator, wherein the calculator comprises a set of digital filters arranged along several paths to update the first adaptive filter;

generating an error signal based on a difference between a filtered input signal and a signal from the first microphone, wherein the filtered input signal is based on a first transfer function estimate of the transducer-to-first microphone transfer function via a first acoustic path, updating coefficients of the first adaptive filter using the error signal, and generating with the first adaptive filter a first noise-cancellation signal;

using the calculator, estimating the first transfer function of the transducer-to-first microphone transfer function via the first acoustic path;

wherein the calculator comprises an estimator digital filter configured to estimate the first transfer function and to provide the filtered input signal, and wherein the calculator is configured to estimate the first transfer function using an adaptive algorithm.

15. A non-transitory computer-readable data carrier having stored thereon instructions which when executed by a computer cause the computer to estimate with an estimator digital filter a first transfer function of a transducer-to-first microphone transfer function via a first acoustic path; generate an error signal based on a difference between a filtered input signal and a signal from a first microphone, wherein the filtered input signal is based on the first transfer function estimate of the transducer-to-first microphone transfer function via a first acoustic path, update coefficients of the first adaptive filter using the error signal via a set of digital filters arranged along several paths and generate with the first adaptive filter a first noise-cancellation signal;

wherein the first transfer function is estimated using an adaptive algorithm.

16. An active noise cancellation system comprising a transducer;

a first microphone; and a first adaptive filter coupled to a calculator; the calculator being configured to generate an error signal based on a difference between a filtered input signal and a signal from the first microphone, wherein the filtered input signal is based on a first transfer function estimate of the transducer-to-first microphone transfer function via a first acoustic path, to update coefficients of the first adaptive filter using the error signal, and to generate with the first adaptive filter a first noise-cancellation signal, wherein the first adaptive filter is a sparse filter in which filter taps are divided in subsets of filter taps.

* * * * *